United States Patent
Ku

(10) Patent No.: US 8,761,724 B2
(45) Date of Patent: Jun. 24, 2014

(54) APPARATUS AND METHOD FOR DISPLAYING DISCOUNT DATA IN A MOBILE COMMUNICATION TERMINAL

(75) Inventor: Ah-Young Ku, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1524 days.

(21) Appl. No.: 11/807,965

(22) Filed: May 31, 2007

(65) Prior Publication Data

US 2007/0287416 A1    Dec. 13, 2007

(30) Foreign Application Priority Data

Jun. 9, 2006   (KR) .................... 2006-51669

(51) Int. Cl.
*H04M 11/00*   (2006.01)

(52) U.S. Cl.
USPC ........... 455/406; 455/405; 455/408; 455/453; 455/564; 455/566

(58) Field of Classification Search
USPC .......... 455/405–408, 461, 463, 452–453, 558
See application file for complete search history.

(56) References Cited

U.S. PATENT DOCUMENTS

| | | | | |
|---|---|---|---|---|
| 5,539,530 A | * | 7/1996 | Reifman et al. | 358/402 |
| 6,366,780 B1 | * | 4/2002 | Obhan | 455/453 |
| 6,912,399 B2 | * | 6/2005 | Zirul et al. | 455/463 |
| 7,174,174 B2 | * | 2/2007 | Boris et al. | 455/461 |
| 7,650,137 B2 | * | 1/2010 | Jobs et al. | 455/405 |
| 2002/0022472 A1 | * | 2/2002 | Watler et al. | 455/405 |

FOREIGN PATENT DOCUMENTS

| | | |
|---|---|---|
| KR | 1020010011059 | 2/2001 |
| KR | 1020010047654 | 6/2001 |
| KR | 1020030048968 | 6/2003 |
| KR | 1020050018376 | 2/2005 |
| KR | 1020050022641 | 3/2005 |
| KR | 1020050065918 | 6/2005 |

\* cited by examiner

*Primary Examiner* — Michael T Vu

(74) *Attorney, Agent, or Firm* — The Farrell Law Firm, P.C.

(57) ABSTRACT

An apparatus and a method for displaying discount data in a mobile communication terminal are provided. The method includes determining whether displaying discount data is set; and when the displaying of the discount data is set, checking discount data provided by a billing system of a subscriber recorded on a Subscriber Identification Module/Universal Subscriber Identification Module (SIM/USIM) card.

9 Claims, 4 Drawing Sheets

APPARATUS AND METHOD FOR DISPLAYING DISCOUNT DATA IN A MOBILE COMMUNICATION TERMINAL

PRIORITY

This application claims priority under 35 U.S.C. §119(a) to a Korean Patent Application filed in the Korean Intellectual Property Office on Jun. 9, 2006 and assigned Serial No. 2006-51669, the contents of which are incorporated herein by reference.

BACKGROUND OF THE INVENTION

1. Field of the Invention

The present invention relates generally to an apparatus and a method for displaying discount data in a mobile communication terminal, and in particular, to an apparatus and a method for displaying discount data according to a subscriber's billing system using a Subscriber Identity Module (SIM)/Universal Subscriber Identity Module (USIM) Application Toolkit (SAT) in the mobile communication terminal.

2. Description of the Related Art

Today, the use of mobile communication terminals has rapidly increased because of their portability. Accordingly, mobile communication service providers provide convenient and special services in order to secure more subscribers of mobile communication terminals. For example, mobile communication service providers provide services allowing a subscriber of a mobile communication terminal to select a billing system according to the subscriber's usage pattern.

The billing system selection service discounts a communication rate for a predetermined time band for each billing system with consideration of various living patterns of respective subscribers, thereby allowing each subscriber to select and use a billing system which provides a discount time band appropriate for the subscriber's usage pattern.

However, the billing system selection service can lead to confusion and inconvenience in that a subscriber can receive a discount benefit provided by the billing system only when the subscriber exactly recognizes a discount time band as the subscriber is attempting to communicate. Also, since the billing systems are numerous and typically include complicated discount rates depending on the kind of the billing system used and the communication time band used, the subscriber has difficulty in memorizing the exact billing system.

SUMMARY OF THE INVENTION

An object of the present invention is to substantially solve at least the above problems and/or disadvantages and to provide at least the advantages below. Accordingly, an object of the present invention is to provide an apparatus and a method for displaying discount data in a mobile communication terminal.

Another object of the present invention is to provide an apparatus and a method for displaying discount data depending on a subscriber's billing system using a SAT in a mobile communication terminal.

According to one aspect of the present invention, a method for displaying discount data in a mobile communication terminal includes examining whether displaying discount data is set; and when the displaying of the discount data is set, checking discount data provided by a billing system of a subscriber recorded on a Subscriber/Universal Subscriber Identification Module (SIM) card.

According to another aspect of the present invention, an apparatus for displaying discount data in a mobile communication terminal includes a SIM card for storing discount data provided by a billing system of a subscriber, and for checking the stored discount data depending on whether set discount data is displayed; and a control unit for providing whether to display the set discount data to the SIM card, and for receiving the discount data from the SIM card.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention with unnecessary detail.

Hereinafter, an apparatus and a method for displaying, at a portable terminal, discount data provided by a subscriber's billing system using a SAT will be described in detail. Here, the SAT is a series of commands and procedures for providing, to a network operator, unique service of its own to a subscriber of a mobile communication terminal. That is, the SAT functions as an interface for performing data communication between the mobile communication terminal and a Subscriber Identification Module (SIM) or a Universal SIM (USIM).

Hereinafter, data communication between a mobile communication terminal and a SIM card is performed using the SAT. The SIM card includes the USIM as well as the SIM.

Figure 1:
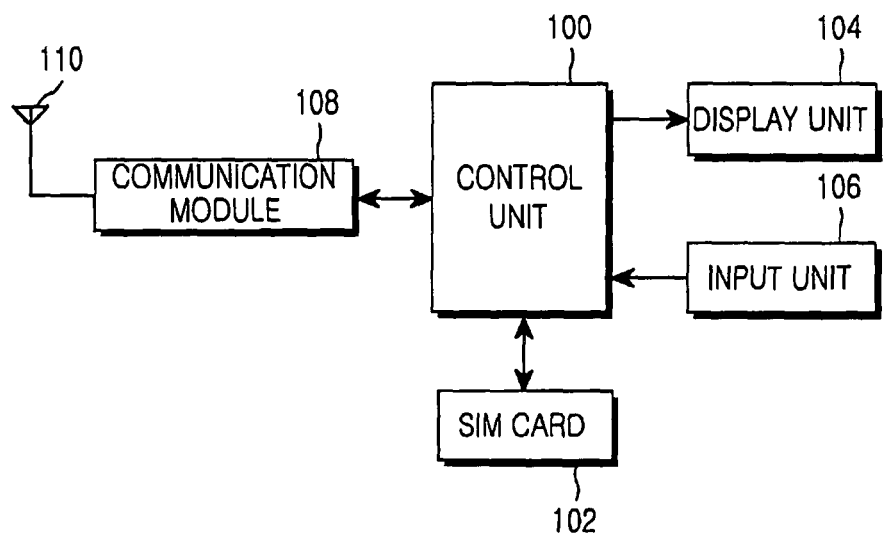
FIG. 1 is a block diagram illustrating a construction of a mobile communication terminal according to the present invention.

FIG. 1 illustrates a block diagram of a mobile communication terminal according to the present invention. Here, the mobile communication terminal includes a control unit 100, an SIM card 102, a display unit 104, an input unit 106, a communication module 108, and an antenna 110.

In FIG. 1, the control unit 100 processes and controls voice communication and data communication. Particularly, the control unit 100 indicates that a discount data display event has occurred to the SIM card 102 via the SAT when the discount data display event occurs. The control unit 100 then receives a list of settings and determines whether to display the discount data from the SIM card 102 and whether to display the discount data set by a subscriber to the SIM card 102. Subsequently, the control unit 100 receives discount data such as a discount time band and a discount rate provided by a billing system, and determines whether to display the discount data via the SAT, thereby controlling the function of outputting the discount time band to the display unit 104.

The SIM card 102 includes a microprocessor and a memory chip therein, and is adapted to store subscriber data. Moreover, SIM card 102 can be detachably mounted in the mobile communication terminal. Particularly, the SIM card 102 according to the present invention stores discount data such as, for example, discount time bands for a respective rate and a discount rate of a service providing company. In addition, the SIM card 102 provides a list of settings which determine whether to display the discount data from the control unit 100 when a SAT indicates that the discount data display event occurs is received from the control unit 100. The SIM card 102 also provides the discount data according to a rate used by a mobile communication terminal and determines whether to display the discount data to the control unit 100 when the discount data is input from the control unit 100.

The display unit 104 displays state data occurring during operation of the mobile communication terminal and a limited number of characters. Particularly, the display unit 104 displays discount data according to a billing system of the mobile communication terminal as controlled by the control unit 100 according to the present invention.

The input unit 106 includes a plurality of keys and provides data to the control unit 100 corresponding to the keys pressed by a subscriber. Particularly, the input unit 106 receives data to determine whether to display the discount data from the subscriber and provides the same to the control unit 100 according to the present invention.

The communication module 108 transmits/receives wireless signals of data input/output via the antenna 110. For example, during transmission, the communication module 108 converts baseband signals obtained by channel coding and spreading data to be transmitted into Radio Frequency (RF) signals, and transmits the converted RF signals via the antenna 110. On the other hand, during reception, the communication module 108 converts received RF signals into baseband signals, and despreads and channel-decodes the baseband signals to recover data from the signals.

Figure 2:
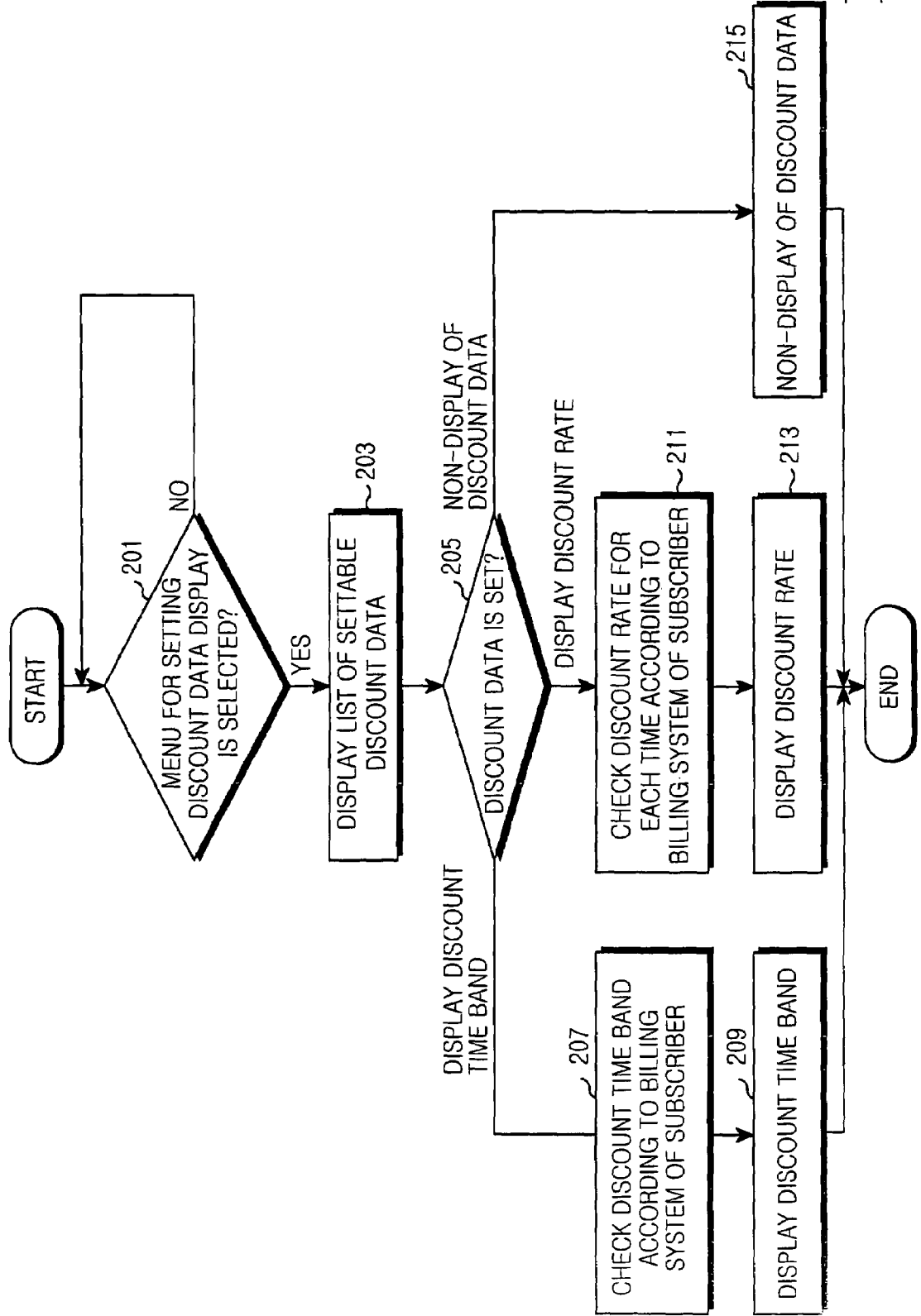
FIG. 2 is a flowchart illustrating a process for displaying discount data for each billing system in a mobile communication terminal according to the present invention.

FIG. 2 is a flowchart illustrating a process for displaying discount data for each billing system in a mobile communication terminal according to the present invention.

In FIG. 2, in step 201, the mobile communication terminal examines whether a menu for displaying discount data according to a billing system is selected on a display unit 104 by a subscriber. When the menu for displaying the discount data is selected, the mobile communication terminal displays a display list of settable discount data on the display unit 104 in step 203. For example, the mobile communication terminal can display "1: discount time band display 2: display of discount rate for each time band 3: non-display of discount data" on the display unit 104.

Figure 4A:
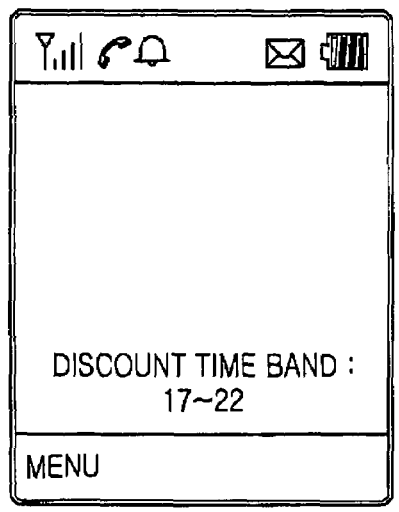
FIG. 4 illustrates screen shots for displaying discount data at a mobile communication terminal according to the present invention.
Figure 4B:
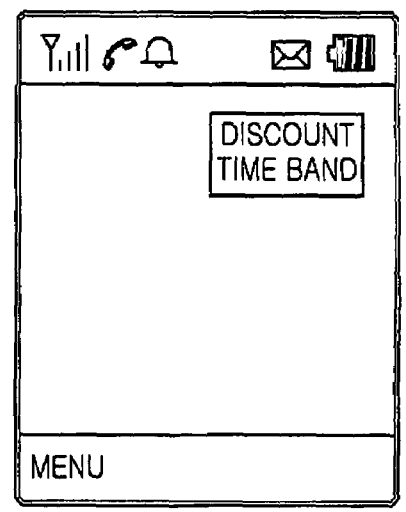

Thereafter, in step 205, the mobile communication terminal examines whether a predetermine item from the display list of the settable discount data is set by key manipulation of a subscriber. When the "discount time band display" is set, the mobile communication terminal performs step 207 to check a discount time band according to a billing system currently being used from a SIM card 102 and then performs step 209 to display the checked discount time band on the display unit 104. At this point, whether the current time belongs to the discount time band can be displayed on the display unit 104 as well as the discount time band. For example, as shown in FIG. 4A, a discount time band according to a subscriber's billing system can be displayed. Also, as shown in FIG. 4B, a predetermined image representing whether a current time belongs to the discount time band, that is, the predetermined image representing the discount time band can be displayed only when the current time belongs to the discount time band. Thereafter, the mobile communication terminal ends the process according to the present invention.

Figure 4C:
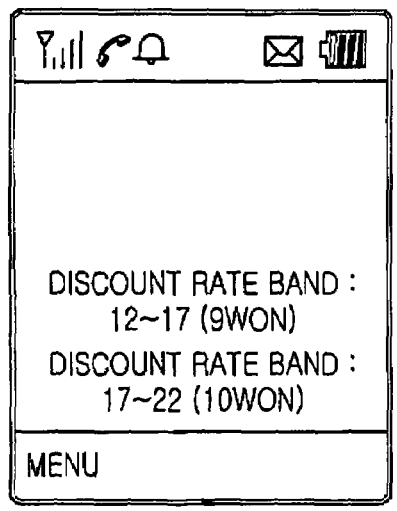
Figure 4D:
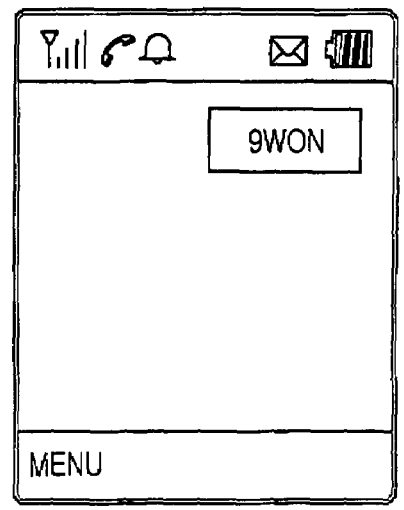

In step 205, when the "display of discount rate for each time band" is set from the list in step 205, the mobile communication terminal performs step 211 to check a discount rate for each time band according to a billing system currently used from SIM card 102, and performs step 213 to display the checked discount rate on the display unit 104. For example, as illustrated in FIG. 4C, a discount rate according to each time band can be displayed, or only a discount rate of a current time can be displayed as illustrated in FIG. 4D.

In addition, when the "non-display of discount data" is set in step 205, the mobile communication terminal checks whether discount data is being displayed on the display unit 104 in step 215, deletes the discount data that is being displayed, and ends the process according to the present invention.

Figure 3:
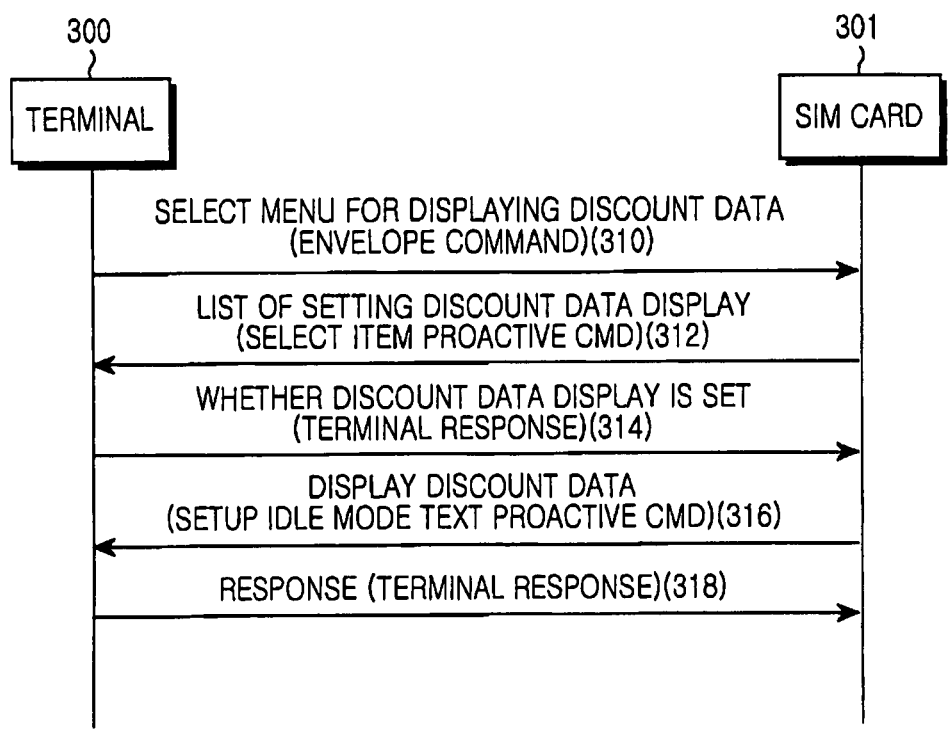
FIG. 3 is a flow diagram illustrating a process between a terminal and a SIM card, for displaying discount data at a mobile communication terminal according the present invention.

FIG. 3 is a flow diagram illustrating a process between a terminal 300 and an SIM card 301, for displaying discount data at a mobile communication terminal according to an embodiment of the present invention. Here, the terminal means a mobile communication terminal excluding an SIM card.

In FIG. 3, when a menu for displaying discount data is selected on a display unit 104 by a subscriber, terminal 300 indicates that the menu for displaying the discount data is selected from an SIM card 301 in step 310. Here, the terminal 300 can indicate that the menu for displaying the discount data is selected by transmitting an envelope command provided from an SAT to the SIM card 301.

In step 312, the SIM card 301 that has received the envelope command transmits a list for settings whether to display the discount data to the terminal 300. For example, the SIM card 301 can transmit a list such as "1: discount time band display 2: display of discount rate for each time band 3: non-display of discount data". Here, the SIM card 301 can use a select item proactive command from the SAT in order to transmit the list of settings whether to display the discount data to the terminal 300.

Next, the terminal 300 displays the received list on the display unit 104 to allow a subscriber to select one item from the items on the list regarding the displaying of the discount data, and transmits the selected item to the SIM card 301 in a step 314. Here, the selected item can be transmitted using a terminal response, which is a response to the select item proactive command. At this point, when the "discount time band display" or the "display of discount rate for each time band" is selected, that discount data display is activated is transmitted to the SIM card 301 using the terminal response in step 318. Conversely, when the "non-display of discount data" is selected, the discount data display is deactivated.

Next, the SIM 301 checks the selected item, checks a discount time band according to a subscriber's billing system when the selected item is the "discount time band display", and checks a discount rate for each time band according to the subscriber's billing system when the selected item is the "display of discount rate for each time band", and transmits the checked discount rate to the terminal 300, thereby requesting terminal 300 to display the checked discount data on the display unit 104 in step 316. When the selected item is the "non-display of discount data", the SIM card 301 requests terminal 300 to delete discount data that is being displayed on the display unit 104. Here, the SIM card 301 can transmit the checked discount time band, discount rate, and whether to display discount data to the terminal 300 using a Setup Idle Mode Text Proactive Cmd provided by the SAT.

Thereafter, the terminal 300 displays discount data received from the SIM card 301 on the display unit 104, and transmits whether displaying the discount data is successful to the SIM card 301. Here, the terminal 300 can transmit whether displaying the discount data is successful to the SIM card 301 using the terminal response in step 318.

As described above, according to the present invention, a mobile communication terminal displays a communication rate discount time band recorded on a SIM card using the SAT, thereby providing an additional service which is capable of effectively managing a communication rate to a subscriber.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for displaying discount data in a mobile communication terminal, the method comprising:
    receiving and displaying a menu including at least one item associated with the discount data, from a Subscriber Identification Module/Universal Subscriber Identification Module (SIM/USIM);
    selecting one of the at least one item of the displayed menu;
    transmitting the selected item to the SIM/USIM card;
    receiving the discount data associated with the selected item, from the SIM/USIM card; and
    displaying the received discount data associated with the selected item,
    wherein the discount data is information associated with a billing system of a subscriber, recorded on the SIM/USIM card.

2. The method of claim 1, further comprising displaying the discount data on a predetermined position of a display unit.

3. The method of claim 1, wherein the discount data recorded on the SIM/USIM card is checked using an SIM/USIM Application Toolkit (SAT).

4. The method of claim 1, wherein the discount data comprises at least one of a discount time band and a discount price for each time band.

5. The method of claim 1, further comprising, when non-displaying of the discount data is set, deleting the discount data displayed on a predetermined position of a display unit.

6. A mobile communication terminal, the apparatus comprising:
    a SIM/USIM card for transmitting a menu including at least one item associated with the discount data requested, from the mobile communication terminal; and
    a control unit for receiving and displaying the menu including the at least one item associated with the discount data, from a Subscriber Identification Module/Universal Subscriber Identification Module (SIM/USIM), selecting one of the at least one item of the displayed menu, transmitting the selected item to the SIM/USIM card, and receiving the discount data associated with the selected item from the SIM/USIM card; and
    displaying the received discount data associated with the selected item,
    wherein the discount data is information associated with a billing system of a subscriber, recorded on the SIM/USIM card.

7. The mobile communication terminal of claim 6, further comprising a display unit for receiving the discount data from the control unit and displaying the received discount data.

8. The mobile communication terminal of claim 6, wherein the discount data comprises at least one of a discount time band and a discount price for each time band.

9. The mobile communication terminal of claim 6, wherein the control unit and the SIM card perform data communication using an SIM/USIM Application Toolkit (SAT).

\* \* \* \* \*